Dec. 18, 1934.  E. H. FOLEY  1,984,406
RECORDING AND INDICATING SOUND
Original Filed May 15, 1930
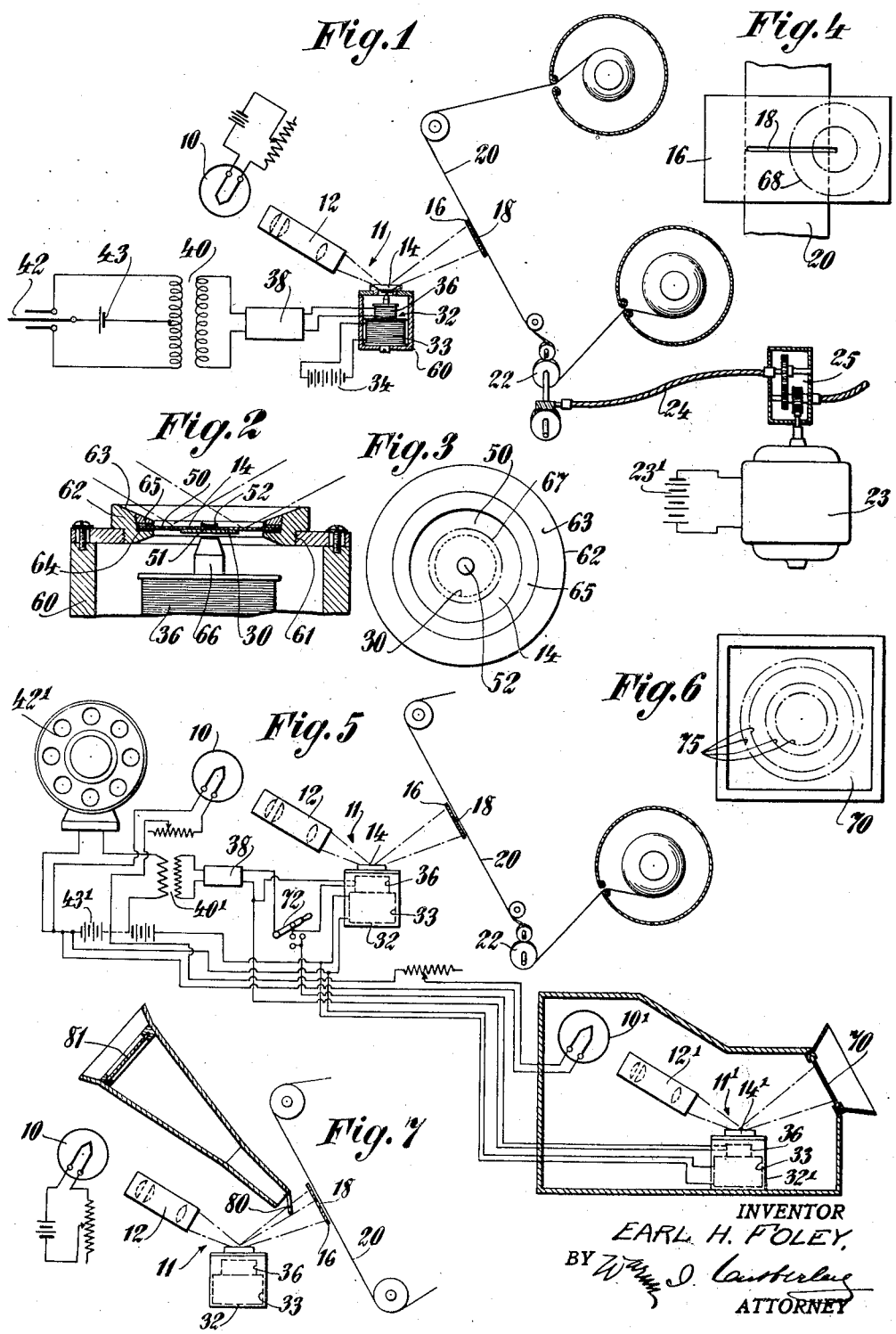
INVENTOR
EARL H. FOLEY,
BY
ATTORNEY Patented Dec. 18, 1934

1,984,406

UNITED STATES PATENT OFFICE 1,984,406

RECORDING AND INDICATING SOUND

Earl H. Foley, New York, N. Y., assignor to Filmtone Corporation, a corporation of Delaware Application May 15, 1930, Serial No. 452,645
Renewed May 12, 1934

4 Claims. (Cl. 179—100.3)

This invention relates to recording or indicating sound, particularly through the medium of a vibratory reflecting member which serves to vary a beam of light in accordance with sound vibrations.

One object of my invention is to provide an improved sound recording device operated in this manner and wherein means is provided for recording sound on a moving photographic film and a further object of my invention is to provide a similar device wherein the varying light beam is caused to fall on a translucent screen so as to form a visual indication of the variations of light corresponding to the sound vibrations.

A further object of my invention is to provide a sound recorder or indicator of this character which is simple and inexpensive in construction, efficient and accurate in operation, can be easily manipulated and adjusted and is strong and durable in use.

A further object of my invention is to provide means whereby recording of the original sound may be manually controlled in accordance with the requirements of final reproduction.

A further object of my invention is to provide an improved system of recording or indicating sound adapted to utilize one or more of my improved recording or indicating devices.

In sound records now in use wherein the sound is received by the microphone and the resulting current variations are amplified and serve to operate a recording device, it is the practice to use amplifiers of relatively high amplifying power so as to produce sufficient electrical power for the operation of the recording devices. The use of sound recorders now employed particularly with amplifiers of high amplifying power, are objectionable for a number of reasons. Such amplifiers involve more or less complicated circuits, require considerable energy for their operation and necessitate the use of heavy batteries and other sources of current supply. This is particularly objectionable where it becomes necessary to transport the recording apparatus from place to place, as for example, where the recorder is employed in conjunction with the taking of moving pictures "on location". Furthermore the sound records produced by the present recording systems do not accurately represent the initial sound, partly because of the inertia effects of the relatively heavy vibratory parts of the recording devices and partly because of the distortion produced by the amplifiers.

Another defect of the present systems of sound recording, which employ a high degree of amplification, is that stray sounds, such as slight sounds occurring near the microphone, produce disturbing effects which are highly amplified and appear in magnified form in the sound record.

In accordance with the present invention I am able to eliminate, to a large extent, the defects or disadvantages above noted. In my improved system I make use of a sensitive recording device which is designed to be operated by currents of relatively low power, and such amplifiers as I employ are designed for relatively low amplification. The sound recorder, which is very sensitive to current variations, produces an accurate record of such variations, and by eliminating the amplifiers now used I avoid the distortion now introduced into the sound record.

My system of recording sound does not necessarily require the placing of the microphone in such a position relative to the source of sound as to avoid the disturbing effects of stray or undesired sounds. My present system comprehends an improved means whereby the final sound record will correspond capably to impressions received by the human ear or without disproportionate amplification. When sound is being recorded simultaneously from a number of sources of sound, as from the different instruments of an orchestra, I may, if desired, employ a plurality of microphones located respectively adjacent the different sound sources and connect these microphones with sound recorders so as to produce a multiple sound record, in a manner similar to that disclosed in my Patent No. 1,589,139.

My improved recorder and other parts of my recording system are of light weight and may be easily transported from place to place. The system requires little power for its operation and does not necessitate the use of heavy batteries or other current generators.

In the recorder herein disclosed the vibratory member for causing variations in a beam of light is a small reflecting diaphragm of magnetic or non-magnetic material, such as glass, mica or the like, securely clamped around its outer edge and carrying at its center an armature positioned in the field of an operating electro-magnet. The "sound currents" flow through a coil of the electro-magnet and vary the attraction of the magnet for the armature causing the vibration of the armature and varying the distortion or bending of the diaphragm. The light beam, which falls on the center of the diaphragm, is reflected as a beam whose cross-sectional area is dependent upon the position of the armature or curvature or bending of the diaphragm. When the device is used for recording on a moving photographic film, the reflected light passes through a slotted screen and as the beam varies in diameter, more or less of the width of the film is exposed to the light, forming a so-called saw-tooth record. The source of light for the beam may be a small incandescent lamp of the same type as that used for the ordinary low voltage pocket flash lamp and the battery for supplying current to the lamp will be of correspondingly low voltage.

By employing a vibrating diaphragm, constructed as above described, I am able to reduce to a minimum the mass of the moving parts and so produce a record which is extremely sensitive and will respond accurately to slight current variation of high audio frequency.

In another embodiment of my invention employing a reflecting diaphragm of this character, instead of causing the light to pass through a slotted screen on to a photographic film, I provide a translucent or similar screen on which the reflecting beam falls, this latter screen being so arranged as to permit the spot of light on the screen to be viewed and the amplitude of the light variations, caused by movement of the diaphragm, observed. The device thus forms an indicator of the effect of the sound waves on the diaphragm.

In one form of my invention I make use of such an indicator, in conjunction with a sound recorder, for indicating operating conditions of the recorder. An instance of such use is the simultaneous taking of motion pictures and the recording of sound for the so-called "talking movies". In this case the pictures are taken by the camera and simultaneously therewith a record is made of the accompanying sound by a system including a microphone, amplifier and sound recorder. The motion picture camera is provided with a focusing screen for showing the light effect on the camera. By the use of the present recorder and indicator the effects of the sound on the recorder are also shown, the indicator serving a similar purpose to the focusing screen of the camera. The indicator may be separate from or connected with the sound recorder and mounted adjacent to the focusing device for the camera so that the camera operator may be able to see at the same time the camera field and the field representing the sound record and when conditions are proper for taking the picture and making the sound record, the taking of the picture and recording of the sound may be begun. Suitable means may be provided for connecting the sound indicator and sound recorder alternately in circuit with the microphone, or in certain cases, both recorder and indicator may be operated simultaneously, in which case, the character of the sound record being made, will be observed throughout the progress of the scene.

In another modification of my invention I embody the indicating means in the recorder itself, for example by providing means whereby a portion of the beam of light which is reflected from the vibrating diaphragm, is again reflected onto the translucent screen and another part of the beam allowed to pass through the slotted screen to the camera film. By observing the spot of light on the translucent screen the actual operation of the sound recorder may be observed, and if necessary, requisite adjustments made for making a satisfactory record as by consistent resistant control.

Other objects and advantages of my invention will appear from the following description taken in connection with the accompanying drawing, wherein Figure 1 is a diagrammatic view of a sound recording system embodying one form of my invention, Figure 2 is an enlarged view of one form of vibratory reflecting diaphragm for use in my improved recorder together with a portion of the casing in which the diaphragm is mounted, Figure 3 is a top plan view of the diaphragm and holding means shown in Figure 2, Figure 4 is a diagrammatic view of the slotted screen of the recorder, and a portion of the photographic film with outlines of the spot of reflected light indicated in dotted lines, Figure 5 is a view similar to Figure 1 but showing, in addition to the sound recorder, a sound indicator together with means for connecting the recorder and indicator alternately in circuit to be operated from the microphone.

Figure 6 is a diagrammatic view of the translucent screen upon which the reflected light beam falls, and Figure 7 shows a modification wherein part of the reflected beam passes through a slotted screen and serves to form a sound record in a moving film and another portion of the reflected beam is again reflected and falls on a translucent screen where it can be observed.

Referring to Figure 1 of the drawing, 10 represents a source of illumination for a photographic recording device 11, this source being shown as a small incandescent lamp which may be supplied from a low voltage battery; 12 represents an optical system for forming a beam of light, this system comprising condensing and projecting lenses and means for polarizing the light; 14 represents a flexible or resilient diaphragm which serves to reflect the beam, from the lens system 12; 16 represents a screen having a slot 18; 20 a photographic film adapted to be moved past the slot 18 by a suitable feeding means such as a friction roller or drum 22 operated from a motor 23 by a flexible drive shaft 24. The motor is supplied from a separate source of current shown as a battery 23'. Suitable gearing 25 may, if desired, be interposed between the motor shaft and flexible shaft. Such gearing will normally be employed when the motor 23 serves also to drive the feed of a motion picture camera, the gearing 25 serving to provide the desired gear ratio between the sound recording film 20 and the motion picture film of the camera as described in my copending application, Serial No. 453,295 filed May 17, 1930.

For the purpose of vibrating the reflecting diaphragm 14, I provide at the center of the diaphragm a metallic disc or button 30 which is positioned in the field of an electro-magnet 32 having a winding 33 adapted to be supplied with constant or uniform current from a source of current 34 and a winding 36 adapted to be supplied with current which varies in accordance with the sound vibrations to be recorded. The winding 36 is in the output circuit of the amplifier 38 having an input circuit connected to the secondary of the step-up transformer 40, the primary of which is in circuit with the condenser microphone 42 and a suitable source of current supply 43.

It will of course be understood that in reproducing from the film with the developed saw tooth record thereon the film may be passed across a screen similar to the screen 16 with a slot so arranged with respect to the film that varying quantities of light from a suitable source of illumination will pass through the film and slot onto a suitable light responsive device such as a photoelectric cell.

I show in Figures 2 and 3 one form of reflecting diaphragm 14. This diaphragm consists of a small thin glass disc 50 which is silvered on its lower side and is provided with an opening 51 adapted to receive a small screw or bolt 52 which serves to secure to the under side of the disc 50 the button or disc 30 of magnetic material, preferably of low retentivity, which forms the armature of the electro-magnet. The screw or bolt 52 may be nickel or silver-plated and the upper surface of the head is polished.

It will be understood that Figures 2 and 3 show the disc 50 on an enlarged scale. In practice I find that the circular glass cover for the usual microscope slide, which measures approximately 12-20 millimeters in diameter, forms a satisfactory diaphragm.

The electro-magnet 32 is carried in a suitable supporting frame or casing 60 which has at its top a screw threaded opening 61 for reception of the bushing 62. The bushing 62 is formed with an inclined upper face 63 and an inset shoulder 64 which form a seat for the outer edge of the diaphragm, the outer edge being clamped in place by an externally screw-threaded ring 65 which screws into the bushing 62, suitable gaskets being employed between the diaphragm and the bushing and diaphragm and ring to prevent injury to the glass.

The magnet 32 is provided with a pole piece 66 located adjacent to and immediately beneath the armature 30 and in practice I preferably make this pole piece screw-threaded and adjustable so that the distance between the pole and the armature may be varied as desired. The frame of the magnet is formed of magnetic material so as to provide a path of low reluctance for the magnetic flux, and the top of the frame is laterally adjustable so as to provide means for centering the diaphragm above the pole piece.

In practice the parts are arranged or adjusted so that the beam of light from the lamp 10 falls on the center of the reflecting diaphragm 14, preferably though not necessarily at a relatively small acute angle, the spot of light on the diaphragm being of slightly greater diameter than the armature disc 30 as indicated at 67 in Figure 3. This beam of light is reflected and falls on the screen 16, as indicated at 68, in Figure 4, part of the beam passing through the slot 18. In operation sound received in the microphone 42 causes variations of current in the primary of the transformer 40 and the corresponding variations in the secondary are amplified by the apparatus 38 and the amplified currents flow through the winding 36 of the electro-magnet 32. Variations of the amplified currents in the winding 36 cause a varying attraction of the armature 34 thereby causing a greater or less bending or distortion of the reflecting disc 50. As a result of such variations in the form of the disc, the diameter of the beam of light varies and the band of light passing through the slot 18 varies in width and causes varying widths of the moving film 20 to be exposed to the light, the exposed portion of the film forming a saw-tooth record of the light variations.

In Figure 5 I show diagrammatically at 10, 12, 14, 16 and 20, respectively, the lamp, lens system, diaphragm, slotted screen and photographic film of Figure 1. Also I show in Figure 5 at 10', 12' and 14' a lamp, lens system and diaphragm of the same construction as the corresponding parts 10, 12 and 14. The light from the source 10', however, instead of being reflected by the diaphragm 14' onto a slotted opaque screen is reflected onto a translucent screen 70, such as a screen of ground glass which is suitably mounted to permit the spot of light from the diaphragm to be seen by the observer. Also in Figure 5 I show merely diagrammatically a switch 72 which is adapted to occupy three positions, in one of which the coil 36 of magnet 32 of the sound recorder 11 is connected with the output circuit of the amplifier. In another position of the switch the corresponding coil of magnet 32' of the indicator 11' is connected in this circuit and in the third position the corresponding coils of both magnets 32 and 32' are connected in circuit. The arrangement, construction and adjustment of the corresponding parts of the recorder and indicator will in practice be the same so that the variations of the variations of the beam from the diaphragm of the indicator will correspond quite accurately to the variations of the beam from the diaphragm of the recorder. It is apparent that by throwing the switch 72 to its lower position so as to connect the indicator in circuit, the operation of the recording system will be indicated with reasonable accuracy, and the conditions which would give rise to defective recording may be observed so that the proper adjustments or changes may be made prior to the actual making of the record itself. When conditions are proper for satisfactory recording as observed on the screen 70, the switch 72 may be moved to its upper position connecting the recorder 11 in circuit and the recording started or if it is desired to operate the indicator with recorder so as to observe the sound effects as the record is being made, the switch may be moved to its central position in which the corresponding coils of the magnets 32 and 32' are connected in circuit. In practice as the reflecting diaphragm 14' vibrates the beam of light will be alternately enlarged and reduced in cross-sectional area. For the proper functioning of the apparatus the enlargement or contraction should be of the desired magnitude and should take place within certain limits. These limits may be easily marked on the translucent screen 70 as by means of circular lines 75 shown in Figure 6.

In Figure 5 I show instead of the condenser microphone 42, a conventional magnetic microphone 42' and I provide a single source of current for the input circuit of transformer 40', for the lamp 10 and the field coil of the magnet 32. This source of current is shown as a battery 43' with the various circuits connected with so much of the battery as will give the desired voltage. It will of course be understood that the amplifier 38 includes a suitable source of current. Current for the amplifier may also be supplied from the common source 43'. It is, however, desirable to operate the motor for feeding the film from a separate source of current.

Figure 7 shows diagrammatically a sound recorder and indicator embodied in a single device. In this case a part of the light which would normally fall on the screen 16 at one side of the slot 18, is reflected by a mirror 80 and caused to fall on the translucent screen 81 so mounted that it may be viewed by the observer. It will, of course, be understood that the spot of light reaching the screen 81 will have the form of a sector of a circle. Suitable areas may be marked off on the screen 81 to indicate the correct zones over which the light should move for proper operating conditions. It will also be understood that in the apparatus shown in Figure 7 suitable means will be employed for preventing diffused light from the translucent screen from passing through the slot 18 so as to effect the recording operation.

Wherever in the accompanying claims I employ the term registering, I use this term in the sense of marking or denoting either by a transient indication or by forming a permanent record.

Having now described my invention, what I claim and desire to secure by Letters Patent is:

1. Means for varying a beam of light consisting of a small reflecting diaphragm of glass having an opening at its center, a disc of magnetic material carried at the center of the back of said diaphragm and means for holding said disc to said diaphragm consisting of a means extending through said opening, said means having a highly polished reflecting front surface.

2. A small, portable indicating device for sound recording apparatus, comprising an incandescent lamp, a low voltage battery for supplying said lamp, a lens system for forming a beam of light from said lamp, a small reflecting diaphragm having an armature secured to its center, a magnet for moving said armature and a translucent screen for receiving the beam of light reflected from said diaphragm and indicating the range of variations thereof.

3. In a sound register, means forming a beam of light, means for reflecting the beam consisting of a small reflecting disc of glass, means for clamping the disc around its edge, a metallic button secured to the center of said disc, and forming an armature, a magnet having an adjustable pole piece located adjacent the center of said armature, exciting means for said magnet forming a permanent magnetic field, a coil on said magnet for varying said field, and means for receiving the beam of light reflected from said disc.

4. In a sound registering device, a vibratory reflecting diaphragm consisting of a thin disc of non-magnetic material, means for clamping said disc around its edge, an armature connected at the center of said disc by means extending through said disc, a magnet having a single centrally located pole adjacent said armature, said magnet having a coil for carrying sound currents and causing vibration of said armature, means for focusing a beam of light at the center of said disc and around the armature connecting means and means for receiving the beam reflected from said disc.

EARL H. FOLEY.